(12) United States Patent
David et al.

(10) Patent No.: US 6,579,466 B1
(45) Date of Patent: Jun. 17, 2003

(54) SULPHONATED POLYESTERS AS FINISHING AGENTS IN DETERGENT, RINSING, SOFTENING AND TEXTILE TREATMENT COMPOSITIONS

(75) Inventors: Claire David, Paris (FR); Etienne Fleury, Irigny (FR); Yvette Girardeau, Fontaines-sur-Saone (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/887,664

(22) Filed: Nov. 20, 1997

Related U.S. Application Data

(62) Division of application No. 08/737,548, filed as application No. PCT/FR95/00658 on Nov. 12, 1996, now abandoned.

(30) Foreign Application Priority Data

May 30, 1994 (FR) .............................. 94 06525
Sep. 12, 1994 (FR) .............................. 94 10857

(51) Int. Cl.$^7$ .......................... D06M 9/50; C08G 63/68
(52) U.S. Cl. ................. 252/8.61; 528/295; 528/302; 528/308; 528/308.6; 528/361; 252/8.62; 252/8.83; 510/299; 510/400
(58) Field of Search ................. 528/295, 302, 528/308, 308.6, 361; 252/8.61, 8.62, 8.83; 510/299, 400

(56) References Cited

U.S. PATENT DOCUMENTS

| | | | | |
|---|---|---|---|---|
| 4,877,896 A | * | 10/1989 | Maldonado et al. | 510/299 |
| 5,290,631 A | | 3/1994 | Fleury | 428/364 |
| 5,599,782 A | * | 2/1997 | Pan et al. | 510/299 |
| 5,843,878 A | * | 12/1998 | Gosselink et al. | 510/299 |

* cited by examiner

*Primary Examiner*—Samuel A. Acquah

(57) ABSTRACT

New water-dispersible or water-soluble sulphonated polyesters with a number molecular mass lower than 20000, exhibiting a sulphur weight content of the order of 0.5 to 10% and a hydroxyl functional group content, expressed as OH equivalent/kg of polymer, higher than 0.2. They may be employed as antisoiling and/or antiredeposition agents and optionally detergents in detergent compositions, in rinsing, softening or antisoiling treatment compositions, for washing with or without pretreatment, rinsing, softening or the antisoiling treatment of textiles, especially those polyester-based.

14 Claims, No Drawings

SULPHONATED POLYESTERS AS FINISHING AGENTS IN DETERGENT, RINSING, SOFTENING AND TEXTILE TREATMENT COMPOSITIONS

This application is a division of application Ser. No. 08/737,548 filed Nov. 12, 1996 which application is now: abandoned. Which is 371 of PCT/FR 95/00658 filed May. 19, 1995.

The present invention relates to new water-dispersible or water-soluble sulphonated polyesters, to a process for their preparation and to their use as antisoiling and/or antirede-position agent and optionally detergent in detergent compositions, in rinsing, softening or antisoiling ("finishing") treatment compositions, for washing with or without pretreatment, rinsing, softening or the antisoiling treatment of textiles, especially those polyester-based.

According to the invention these are water-dispersible or water-soluble sulphonated polyesters characterized in that they are capable of being obtained by esterification and/or transesterification and polycondensation of a monomer composition based:

on an unsulphonated diacidic monomer (A) consisting of at least one dicarboxylic acid or anhydride chosen from terephthalic, isophthalic and 2,6-naphthaleiedicarboxylic acids or anhydrides or their diesters, in a quantity corresponding to a molar ratio (A)/(A)+(SA) of the order of 9S/100 to 60/100, preferably of the order of 93/100 to 65/100 on a sulphonated diacidic monomer (SA) consisting of at least one sulphonated aromatic or sulphonated aliphatic dicarboxylic acid or anhydride, or their diesters, in a quantity corresponding to a molar ratio (SA)/(A)+(SA) of the order of 5/100 to 40/100, preferably of the order of 7/100 to 35/100, it being possible for up to 50 mol %, preferably up to 30 mol %, of the quantity of usulphonated diacidic monomer (A) and/or of sulphonated diacidic monomer (SA) to be replaced with a hydroxylated diacidic monomer (HA) consisting of at least one hydroxylated aromatic or aliphatic dicarboxylic acid or anhydride or a diester of the 8aid hydroxylated aromatic or aliphatic dicarboxylic acid and on a polyol monomer (P) consisting of at least one polyol chosen from ethylene glycol, propylene glycol, diethylene glycol, dipropylene glycol, glycerol, 1,2,4-butanetriol and 1,2,3-butanetriol, in a quantity corresponding to a ratio of number of OH functional groups of the polyol monomer (P)/number of COOS functional groups or functional group equivalents of the diacidic monomer (A)+(SA)+(HA) of the order of 1.05 to 4, preferably of the order of 1.1 to 3.5 and very particularly of the order of 1.8 to 3 in that the sulphonated diacidic monomer (SA) consists of at least one sulphonated aromatic dicarboxylic acid or anhydride or of a mixture of sulphonated aromatic acids or anhydrides and of sulphonated aliphatic acids or anhydrides or their diester when the polyol monomer (P) does not contain any polyol other than a glycol or when the hydroxylated diacidic monomer (HA) is absent and in that the said sulphonated polyesters exhibit a number molecular mass lower than 20 000, a sulphur weight content of the order of 0.5 to 10%, preferably of the order of 1.2 to 8% and a hydroxyl functional group content, expressed as OH equivalent/kg of polymer, higher than 0.2.

The hydroxyl functional group contents are estimated by proton NMR; the measurement is carried out in dimethyl sulphoxide.

The number molecular manses are measured by gel permeation chromatography in dimethylacetamide containing $10^2$ N of LiBr, at 25° C. The results are expressed as polystyrene equivalents.

The elementary unit considered in the definition of the mole of monomer (A), (SA) or (HA) is the COOE functional group in the case of the diacids or the COOH functional group equivalent in the case of the anhydrides or of the diesters.

The unsulphonated diacidic monomer (A) preferably consists of 50 to 100 mol %, very particularly of 70 to 90 mol %, of terephthalic acid or anhydride or of one of its lower (methyl, ethyl, propyl, isopropyl, butyl) diesters and of 0 to 50 mol %, very particularly from 10 to 30 mol %, of isophthalic acid or anhydride and/or of 2,6-naphthalenedicarboxylic acid or anhydride or of one of their lower (methyl, ethyl, propyl, isopropyl, butyl) diesters; the preferred diesters are methyl diesters.

In the unsulphonated diacidic monomer (A) there may additionally be present minor quantities of aromatic diacids other than those mentioned above, such as ortho-phthalic acid, anthracene, 1,8-naphthalene, 1,4-naphthalene and biphenyl dicarboxylic acids or aliphatic diacids such as adipic, glutaric, succinic, triaethyladipic, pimelic, azelaic, sebacic, sueric, itaconic and maleic acids, etc. in the form of acid, anhydride or lower (methyl, ethyl, propyl, isopropyl, butyl) diesters.

The sulphonated diacidic monomer (SA) has at least one sulphonic acid group, preferably in the form of an alkali metal (preferably sodium) sulphonate, and two acidic functional groups or acidic functional group equivalents (that is to nay an anhydride functional group or two ester functional groups) attached to one or a number of aromatic rings, when aromatic dicarboxylic acids or anhydrides or their diesters are involved, or to the aliphatic chain when aliphatic dicarboxylic acids or anhydrides or their diesters are involved.

Among the sulphonated diacidic monomers (SA), there may be mentioned aromatic sulphonated dicarboxylic acids or anhydrides such as sulphoisophthalic, sulphoterephthalic, sulpho-ortho-phthalic acids or anhydrides, 4-sulpho-2,7-naphthalenedicarboxylic acids or anhydrides, sulpho-4,4'-bis(hydroxycarbonyl)diphenyl sulphones, sulphodiphenyl-dicarboxylic acids or anhydrides, sulpho-4,4'-bis(hydroxycarbonyl)diphenylmethanes, sulpho-5-phenoxyisophthalic acids or anhydrides or their lower (methyl, ethyl, propyl, isopropyl, butyl) diesters and sulphonated aliphatic sulphonated dicarboxylic acids or anhydrides such an sulphosuccinic acids or anhydrides or their lower (methyl, ethyl, propyl, isopropyl, butyl) diester. The preferred sulphonated diacidic monomers (SA) are sulphoisophthalic and sulphosuccinic acids or anhydrides.and their methyl diesters and very particularly dimethyl 5-sodiooxysulphonylisophthalate.

The hydroxylated diacidic monomer (HA) has at least one hydroxyl group attached to one or a number of aromatic rings when it is an aromatic monomer or to the aliphatic chain when it is an aliphatic monomer.

Among the hydroxylated diacidic monomers (HA) there may be mentioned 5-hydroxyisophthalic, 4-hydroxyisophthalic, 4-hydroxyphthalic, 2-hydroxymethylsuccinic, hydroxymetbylglutaric and hydroxyglutaric acids or anhydrides etc., or their lower (methyl, ethyl, propyl, isopropyl, butyl) diesters.

The polyol monomer (P) preferably used is monoethylene glycol and/or glycerol.

The said water-soluble and/or water-dispersible sulphonated polyesters can be obtained by the usual esterification and/or transesterification and polycondeneation processes, for example by an esterification and/or transesterification reaction, in the presence of a catalyst of esterification/transesterification of the polyol monomer (P) with the various diacidic monomers, each diacid being in the acid or anhydride form or in the form of one of its diesters, and polycondensation of the polyol eaters at reduced pressure in the presence of a polycondensation catalyst.

According to a preferred method of preparation the said water-soluble and/or water-dispersible sulphonated polyesters are obtained by carrying out the following successive stages:

a stage of transesterification (interchange) between, an the one hand, the sulphonated diacidic monomer (SA) in diester form and from 50 to 100 mol %, very particularly from 30 to 90 mol %, of the total quantity of the unsulphonated diacidic monomer (A), in diester form, and, on the other hand, a quantity of polyol monomer (P) corresponding to a ratio of number of OH functional groups, of the polyol monomer (P)/number of COOK functional group equivalents of the said monomers (A) and (SA) in the form of diesters of the order of 1.05 to 4, preferably of the order of 1.1 to 3.5 and very particularly of the order of 1.8 to 3.0 an optional stage of esterification between the possible remaining quantity of the unsulphonated diacidic monomer (A), in diacid or anhydride form, and a quantity of polyol monomer (P) corresponding to a ratio of number of 09 functional groups of the polyol monomer (P)/number of COOH functional groups of the unsulphonated diacidic monomer (A) in diacid or anhydride form of the order of 1.05 to 4, preferably of the order of 1.1 to 3.5 and very particularly of the order of 1.8 to 3.0 a polycondensation stage.

The diesters of the unsulphonated (A) and sulphonated (SA) dicarboxylic acids used in the transesterification (interchange) stage are preferably methyl diesters.

The interchange stage in performed at a temperature higher than or equal to 130° C., preferably of the order of 140 to 220° C. and very particularly of the order of 180 to 220° C.; at this temperature the methanol formed (in the preferred case of the methyl diesters) is removed from the reaction mixture preferably by distillation. This interchange operation is preferably carried out in the presence of a metallic transesterification catalyst, especially a metal carboxylate such an manganese acetate, zinc acetate, cobalt acetate or calcium acetate, or of an organic or inorganic titanate such as butyl titanate, 2,2'2"-nitrilotriethyl titanate (or titanium aminotriethanolate) or calcium titanate. The preferred catalysts are organic titanates; they are used in quantities of the order of at least 0.001% by weight, expressed as titanium, preferably of the order of 0.002% to 0.02% by weight of titanium relative to the weight of reactants present.

The duration of the interchange operation is from 1 to 4 hours; it is generally of the order of 2 to 3 hours.

When more than 90% of the theoretical quantity of methanol has been distilled the excess polyol is removed by raising the temperature of the reaction mixture to 230° C.

The esterification operation is carried out by adding to the reaction mixture the remaining fraction of the unsulphonated diacidic monomer (A), in diacid form, and of the polyol monomer (P) suspended beforehand, at a temperature corresponding to that of the end of the interchange temperature; the addition period is of the order of 1 hour.

This esterification operation is carried out at a temperature of the order of 230 to 280° C., preferably of the order of 250 to 260° C., in the presence of a catalyst of the same type as that for transesterification; the preferred catalysts are organic titanates; they are used in quantities of the order of at least 0.001% by weight expressed as titanium, preferably of the order of 0.002% to 0.02% by weight of titanium relative to the weight of reactants introduced at the esterification stage; the reaction takes place with removal of water, which is drawn off from the reactor at the same time an the excess polyol, The polycondensation operation is preferably carried out at a temperature of the order of 230 to 280° C., preferably of,the order of 240 to 260° C., in another reactor preheated to this temperature and gradually evacuated to a pressure which may be up to 10 Pa; a pressure reduction to approximately 10 millibars lasts of the order of 40 minutes.

The polycondensation operation takes place with removal of polyol molecules. This operation in stopped when the drive torque of the stirrer shaft shows a value equivalent to approximately 0.5 to 5 newton meters for a reaction mane temperature of 250° C. and a stirring rate of 80 revolutions/minute of an anchor-shaped rotor in a 7.5-liter reactor; the torquemeter employed is of Kyowa type, the measurement range of which is between 0 and 100 newton meters.

The vacuum in next broken with nitrogen and the polymer is poured into an ingot mould; after cooling, the polymer in ground.

The preferred sulphonated polyesters are capable of being obtained from terephthalic acid (A1) in (preferably methyl) diester form and isophthalic acid (A2) in the form of diacid or anhydride, or terephthalic acid (A1) in (preferably methyl) diester form and a hydroxylated terephthalic or hydroxylated isophthalic acid (HA) in the form of diacid or anhydride, optionally mixed with isophthalic acid (A2) it the form of diacid or anhydride, in an (A1)/(A1)+(A2), (A1)/(A1)+(HA) or (A1)/(A1)+(HA)+(A2) molar ratio of the order of 100/100 to 50/100, preferably of the order of 90/100 to 70/100 [as monomer (A) or monomers (A) and (HA)]

sulphoisophthalic acid in (preferably methyl) diester form [as monomer (SA)]

monoethylene glycol and/or glycerol [as polyol monomer (P)].

They may be prepared according to the preferred process described above, by carrying out the following successive stages:

a stage of transesterification (interchange) between, on the one hand, the (preferably methyl) diester of terephthalic acid (A1) and the (preferably methyl) diester of sulphoisophthalic acid (SA) and, on the other hand, monoethylene glycol and/or glycerol (P), the ratio of number of OH functional groups of (P)/number of COOH functional group equivalents of (A1)+(SA) being of the order of 1.05 to 4, preferably of the order of 1.1 to 3.5, and very 20 particularly of the order of 1.8 to 3 a stage of esterification between isophthalic acid (A2) and/or hydroxy(iso- or tere)phthalic acid (HA) and, on the other hand, monoethylens glycol and/or glycerol (P), the ratio of number of OH functional groups of (P)/number of COOE functional groups of (A2) +/or (HA) being of the order of 1.05 to 4, preferably of the order of 1.1 to 3.5 and very particularly of the order of 1.8 to 3 a polycondensation stage.

The sulphonated polyesters forming the subject of the invention are very particularly advantageous as antisoiling and/or antiredeposition agents and optionally detergents in detergent compositions, in rinsing, softening or antisoiling ("finishing") treatment compositions for washing with or without pretreatment, rinsing, softening or antisoiling treatment of textiles, especially polyester-based.

A further subject of the present invention is detergent compositions containing of the order of 0.01 to 10%, preferably of the order of 0.1% to 5% and very particularly of the order of 0.2 to 3%, relative to the weight of the said compositions, of the said sulphonated polyesters forming the subject of the invention.

Another subject of the invention consists of the use, as antisoiling agents in detergent compositions for washing textile articles based especially on polyester fibres, of water-dispersible or water-soluble sulphonated polyesters capable of being obtained by esterification and/or transesterification and polycondensation of a monomer composition based:

on an unsulphonated diacidic monomer (A) consisting of at least one dicarboxylic acid or anhydride chosen from terephthalic, isophthalic and 2,6-naphthalenedicarboxylic acids or anhydrides or their diesters, in a quantity corresponding to a molar ratio (A)/(An+(SA) of the order of 95/100 to 60/100, preferably of the order of 93/100 to 65/100 on a sulphonated diacidic monomer (SA) consisting of at least one sulphonated aromatic or sulphonated aliphatic dicarboxylic acid or anhydride, or their diesters, in a quantity corresponding to a molar ratio (SA)/(A)+(SA) of the order of 5/100 to 40/100, preferably of the order of 7/100 to 35/100, it being possible for up to 50 mol %, preferably up to 30 mol %, of the quantity of unsulphonated diacidic monomer (A) and/or of sulphonated diacidic monomer (SA) to be replaced with a hydroxylated diacidic monomer (HA) consisting of at least one hydroxylated aromatic or aliphatic dicarboxylic acid or anhydride or a diester of the said hydroxylated aromatic or aliphatic dicarboxylic acid and on a polyol monomer (P) consisting of at least one polyol chosen from ethylene glycol, propylene glycol, diethylene glycol, dipropylene glycol, glycerol 1,2,4-butanetriol and 1,2,3-butanetriol, in a quantity corresponding to a ratio of number of OH functional groups of the polyol monomer (P)/number of COOH functional groups or functional group equivalents of the diacidic monomers (A)+(SA)+(HA) of the order of 1.05 to 4, preferably of the order of 1.1 to 3.5 and very particularly of the order of 1.8 to 3 the said sulphonated polyesters exhibiting a number molecular mass lower than 20 000, a sulphur weight content of the order of 0.5 to 10%, preferably of the order of 1.2 to 8% and a hydroxyl functional group content, expressed an OH equivalent/kg of polymer, higher than 0.2.

Examples of monomers (A), (SA), (HA) and (P) have already been mentioned above; the operating conditions for preparation of the said sulphonated polyesters are those or equivalent to those also described above.

The detergent compositions for washing textile articles, especially based on polyester fibres, which are particularly advantageous in respect of their ecotoxicological properties, are those containing:

of the order of 0.01 to 10% by weight, preferably of the order of 0.1 to 5% by weight, very particularly of the order of 0.2 to 3% by weight of a water-dispersible or water-soluble sulphonated polyester antisoiling agent described above and of the order of 3 to 40% by weight, preferably of the order of 5 to 35% by weight, of at least one anionic surface-active agent chosen from the sulphates of $C_5-C_{24}$ saturated aliphatic alcohols optionally condensed with approximately 0.5 to 30 moles of ethylene oxide, not more than 5% by weight of the said detergent composition being capable of consisting of another type of anionic surface-active agent with less advantageous ecotoxicological properties, such as $C_1-C_{18}$ alkylbenzenesulphonates.

Among the sulphates of optionally ethoxylated alcohols which may be used there may be mentioned the sulphates of unethoxylated $C_{14}-C_{15}$ (preferably $C_{10}-C_{15}$) alcohols, the sulphates of $C_8-C_{13}$ (preferably $C_{10}-C_{13}$) fatty alcohols condensed with approximately 1 to 30 (preferably 1 to 10) moles of ethylene oxide, and the sulphates of $C_{14}-C_{20}$ (preferably $C_{14}-C_{18}$) fatty alcohols condensed with approximately 4 to 30 moles (preferably 4 to 10 moles) of ethylene oxide.

Other additives of the type of those described below may be present in the detergent compositions besides the said sulphonated polyesters of the invention.

SURFACE-ACTIVE AGENTS, in quantities corresponding to approximately 3–40% by weight relative to the detergent composition, surface-active agents such as
Anionic Surface-active Agents alkyl ester sulphonates of formula R—CH(SO$_3$M)—COOR', where R denotes a $C_8-C_{20}$, preferably $C_{10}-C_{15}$ alkyl radical, R' a $C_1-C_6$, preferably $C_{10}-C_3$ alkyl radical and M an alkali metal (sodium, potassium, lithium) cation, substituted or unsubstituted amonium (methyl-, dimethyl-, trimethyl-, tetramethylammonium, dimethylpiperidinium etc.) or one derived from an alkanolamine (monoethanolamine, diethanolamine, triethanolamine etc.). Very particularly, the methyl ester sulphonates in which the radical R in $C_{14}-C_{16}$ may be mentioned;

alkyl sulphates of formula ROSO$_3$M, where R denotes a $C_5-C_{24}$, preferably $C_{10}-C_{15}$ alkyl or hydroxyalkyl radical, M denotes a hydrogen atom or a cation with the same definition as above, and their ethoxylenated (EO) and/or propoxylenated (PO) derivatives containing on average from 0.5 to 30, preferably from 0.5 to 10 EO and/or PO unite;

alkylamide sulphates of formula RCONHR'OSO$_3$M, where R denotes a $C_2-C_{22}$, preferably $C_6-C_{20}$ alkyl radical, R' a $C_2-C_3$ alkyl radical, M denoting a hydrogen atom or a cation with the same definition as above, and their ethoxylenated (EO) and/or propoxylenated (PO) derivatives containing on average from 0.5 to 60 EO and/or PO units;

salts of $C_5-C_{24}$ preferably $C_{14}-C_{20}$, saturated or unsaturated fatty acids, $C_9-C_{20}$ alkylbenzenesulphonates, primary or secondary $C_8-C_{22}$ alkyl sulphonates, alkylglycerol sulphonates, the sulphonated polycarboxylic acids described in GB-A-1 082 179, paraffin sulphonates N-acyl-N-alkyltaurates, alkyl phosphates, isethionates, alkylsuccinamates, alkylsulphosuccinates, sulphosuccinate monoesters or diesters, N-acylsarcosinates, alkylglycoside sulphates and polyethoxycarboxylates the cation being an alkali metal (sodium, potassium, lithium), a substituted or unsubstituted ammonium residue (methyl-, dimethyl-, trimethyl-, tetramethylammonium, dimethylpiperidinium etc.) or one derived from an alkanolamine (monoethanolamine, diethanolamine, triethanolamine etc.);

Nonionic Surface-active Agents polyoxyalkylenated (polyethoxyethylenated, polyoxypropylenated, polyoxybutylenated) alkylphenols in which the alkyl substituent is $C_6$–$C_{12}$ and containing from 5 to 25 oxyalkylene units; the examples which may be mentioned are Tritons X-45, X-114, X-100 or X-102, marketed by Rohm & Haas Co.;

glucosamide, glucamide, glycerolamide;

polyoxyalkylenated $C_9$–$C_{22}$ aliphatic alcohols containing from 1 to 25 oxyalkylene (oxyethylene, oxypropylene) units; examples which may be mentioned are Tergitol 15-S-9, Tergitol 24-L-6 NMW marketed by Union Carbide Corp., Neodol 45-9, Neodol 23-65, Neodol 45-7, Neodol 45-4 marketed by Shell Chemical Co. and Kyro EOB marketed by the Procter & Gamble Co.;

the products resulting from the condensation of ethylene oxide, the compound resulting from the condensation of propylene oxide with propylene glycol, such as the Pluronics marketed by BASF;

the products resulting from the condensation of ethylene oxide, the compound resulting from the condensation of propylene oxide with ethylenediamine, such as the Tetronics marketed by BASF;

amine oxides such an ($C_{10}$–$C_{13}$ alkyl)dimethylamine oxides and ($C_5$–$C_{22}$ alkoxy)ethyldihydroxyethylamine oxides;

the alkylpolyglycosides described in U.S. Pat. No. 4,565,647;

$C_8$–$C_{20}$ fatty acid aides ethoxylated fatty acids ethoxylated fatty amides ethoxylated amines Catonic Surface-active Agent alkyldimethylammonium halides.

Amphoteric and Zwitterionic Surface-active Agents alkyldimetlylbetaines, alkylamidopropyldimethylbetaines, alkyltrimethylsulphobetaines, the products of condensation of fatty acids and of protein hydrolysates alkylamphoacetates or alkylamphodiacetates in which the alkyl group contains from 6 to 20 carbon atoms.

ADJUVANTS IMPROVING THE PROPERTIES OF THE SURFACE-ACTIVE AGENTS ("BUILDER" AGENTS), in quantities corresponding to approximately 5–50%, preferably to approximately 5–30 by weight for the liquid detergent formulations or to approximately 10–80%, preferably 15–50% by weight for the powder detergent formulations, builder agents such an Inorganic ("Builder") Adjuvants alkali metal, ammonium or alkanolamine polyphosphates (tripolyphosphates, pyrophosphates, orthophosphates, hexametaphosphates)

tetraborates or borate precursors silicates, in particular those which have an $SiO_2/Na_2O$ ratio of the order of 1.6/1 to 3.2/1 and the lamellar silicates described in U.S. Pat. No. 4,664,839 alkali or alkaline-earth metal carbonates (bicarbonates, sesquicarbonates)

cogranulates of hydrated alkali metal silicates and of alkali metal (sodium or potassium) carbonates rich in silicon atoms in Q2 or Q3 form, described in EP-A-10 488 868 crystalline or amorphous alkali metal (sodium, potassium) or ammnonium aminosilicates such as zeolites A, P, X etc.; zeolite A of particle size of the order of 0.1–10 micrometers in preferred Organic ("Builder") Adjuvnats water-soluble polyphosphonates (ethane 1-hydroxy-1,1-diphosphonates, methylenediphosphonate salts etc.)

water-soluble salts of carboxylic polymers or copolymers or their water-soluble salts such as polycarboxylate ethers (oxydisuccinic acid and its salts, tartrate monosuccinic acid and its salts, tartrate disuccinic acid and its salts)

hydroxypolycarboxylate ethers citric acid and its salts, mellitic acid, succinic acid and their salts salts of polyacetic acids (ethylienediaminetetraacetates, nitrilotriacetates, N-(2-hydroxyethyl)nitrilodiacetates) $C_5$–$C_{20}$ alkyl)succinic acids and their salts (2-dodecenylsuccinates, laurysuccinates)

carboxylic polyacetal esters polyaspartic acid, polyglutamic acid and their salts polyimides derived from the polycondensation of aspartic acid and/or of glutamic acid polycarboxymethylated derivatives of glutamic acid or of other amino acids;

BLEACHING AGENTS, in quantities of approximately 0.1–20%, preferably approximately 1–10% by weight, optionally in combination with BLEACHING ACTIVATORS, in quantities of approximately 0.1–60%, preferably of approximately 0.5–40% by weight, agents and activators such as Bleaching Agents perborates such as sodium perborate monohydrate or tetrahydrate peroxygen compounds such as sodium carbonate peroxyhydrate, pyrophosphate peroxyhydrate, urea peroxyhydrate, sodium peroxide, sodium persulphate preferably used in combination with a bleaching activator generating a carboxylic peroxyacid in situ in the washing medium; among theme activators there may be mentioned tetraacetylethylenediamine, tetraacetylmethylenediamine, tetraacetylglycoluryl, sodium p-acetoxybenzene sulphonate, pentaacetylglucone, octaacetyllactose etc.

percarboxylic acids and their salts (called "percarbonates") such as magnesium monoperoxyphthalate hexahydrate, magnesium metachloroperbenzoate, 4-nonylamino-4-oxoperoxybutyric acid, 6-nonylamino-6-oxoperoxycaproic acid, diperoxydodecanedicic acid, the nonylamide of peroxyauccinic acid and decyldiperoxysuciinic acid.

Theme agents may be used in combination with at least one of the antisoiling or antiredeposition agents mentioned below.

Mention may also be made of nonoxygenated bleaching agents acting by photoactivation in the presence of oxygen, agents such as sulphonated aluminium and/or zinc phthalocyanines other ANTISOILING AGENTS, in quantities of approximately 0.01–10%, preferably approximately 0.1–5% and very particularly of the order of 0.2–3% by weight, agents such as cellulose derivatives such as cellulose hydroxyethers, methyl cellulose, ethyl cellulose, hydroxypropyl methyl cellulose, hydroxybutyl methyl

- polyvinyl esters grafted onto polyalkylene backbones, such as polyvinyl acetates grafted onto polyoxyethylene backbones (EP-A-219 048)
- polyvinyl alcohols
- polyester copolymers based on ethylene terephthalate and/or propylene terephthalate and polyoxyethylene terephthalate units, with an ethylene terephthalate and/or propylene terephthalate (number of units)/polyoxyethylene terephthalate (number of units) molar-ratio of the order of 1/10 to 10/1, preferably of the order of 1/1 to 9/1, the polyoxyethylene terephthalates exibiting polyoxyethylene units which have a molecular weight of the order of 300 to 5000, preferably of the order of 600 to 5000 (U.S. Pat. No. 3,959,230, U.S. Pat. No. 3,893,929, U.S. Pat. No. 4,116,896, U.S. Pat. No. 4,702,857, and U.S. Pat. No. 4,770,666);
- the sulphonated polyester oligomers obtained by sulphonation of an oligomer derived from ethoxylated allyl alcohol, from dimethyl terephthalate and from 1,2-propylene diol, containing from3 1 to 4 sulphonated groups (U.S. Pat. No. 4,968,451)
- polyester copolymers based on propylene terephthalate and polyoxyethylene terephthalate units and ending in ethyl or methyl units (U.S. Pat. No. 4,711,730) or polyester oligomers ending in alkylpolyethoxy groups (U.S. Pat. No. 4,702,857) or sulphopolyethoxy (U.S. Pat. No. 4,721,580) or sulphoaroyl (U.S. Pat. No. 4,877,896) anionic groups
- other ANTIREDEPOSITION AGENTS in quantities of approximately 0.01–10% by weight for a powder detergent composition, of approximately 0.01–5% by weight for a liquid detergent composition, agents such as
- ethoxylated monoamines or polyamines, ethoxylated amine polymers (U.S. Pat. No. 4,597,898, EP-A-11 984)
- carboxymethyl cellulose
- sulphonated polyester oligomers obtained by condensation of isophthalic acid, of dimethyl sulphosuccinate and of diethylene glycol (FR-A-2 236 926)
- polyvinylpyrrolidones
- CHELATING AGENTS for iron and for magnesium, in quantities of the order of 0.1–10%, preferably of the order of 0.1–3% by weight, agents such an
- aminocarboxylates such as ethylienediaminetetraacetates, hydroxyethyl ethylenediaminetriacetates, nitrilotriacetates
- aminophosphonates such as nitrilotris (methylenephosphonates)
- polyfunctional aromatic compounds such as dihydroxydisulphobenzenes;
- POLYMERIC DISPERSING AGENTS, in a quantity of the order of 0.1–7% by weight, to control the calcium and magnesium hardness, agents such as
- the water-soluble salts of polycarboxylic acids of molecular mass of the order of 2000 to 100 000, obtained by polymerization or copolymerization of ethylenically unsaturated carboxylic acids such as acrylic acid, maleic acid or anhydride, fumaric acid, itaconic acid, aconitic acid, mesaconic acid, citraconic acid or methylenemalonic acid, and very particularly the polyacrylates of molecular mass of the order of 2 000 to 10 000 (U.S. Pat. No. 3,308,067) and copolymers of acrylic acid and of maleic anhydride of molecular mass of the order of 5 000 to 75 000 (EP-A-69 915)
- polyethylene glycols of molecular mass of the order of 1000 to 50 000;
- FLUORESCENCE AGENTS (BRIGHTENERS), in a quantity of approximately 0.05–1.2% by weight, agents such as stilbene derivatives, pyrazoline, coumarine, fumaric acid, cinnamic acid, azoles, methinecyanines, thiophenes etc. ("The production and application of fluorescent brightening agents"—M. Zanradnik, published by John Wiley & Sons, New York—1982);
- FOAM-SUPPRESSOR AGENTS, in quantities which may range up to 5% by weight, agents such an
- $C_{10}$–$C_{24}$ monocarboxylic fatty acids or their alkali metal, ammonium or alkanolamine salts, fatty acid triglycerides
- aliphatic, alicyclic, aromatic or heterocyclic saturated or unsaturated hydrocarbons such as the paraffins and waxes
- N-alkylaminotriazines
- monostearyl phosphates, monostearyl alcohol phosphates
- polyorganosiloxane oils or resins optionally combined with silica particles;
- SOFTENING AGENTS, in quantities of approximately 0.5–10% by weight, agents such as clays;
- ENZYMES in a quantity which may range to 5 mg by weight, preferably of the order of 0.05–3 mg of active enzyme/g of detergent composition, enzymes such as
- proteases, amylases, lipases, cellulases, peroxydases (U.S. Pat. No. 3,553,139, U.S. Pat. No. 4,101,457, U.S. Pat. No. 4,507,219, U.S. Pat. No. 4,261,868):
- OTHER ADDITIVES such as
- alcohols (methanol, ethanol, propanol, isopropanol, propanediol, ethylene glycol, glycerine)
- buffer agents
- perfumes
- pigments.

The following examples are given by way of illustration.

EXAMPLE 1

Preparation of a Sulphonated Polyester

Into a 7.5-liter stainless Steel reactor fitted with an anchor stirrer rotating at 80 revolutions/min. connected to a Kyowa torquemeter, a jacket for the circulation of a heat transfer fluid and a distillation column controlled by a solenoid valve, are introduced:

12.17 moles of dimethyl terephthalate (2363 g)

1.99 moles of sodium 5-dimethylsulphonate isophthalate (590 g)

40.16 moles of ethylene glycol (2493 g)

54 ppm (by weight) of titanium in the form of butyl orthotitanate.

Tho mixture is preheated to 130° C.

It is then heated to a temperature of 220° C. over approximately 130 minutes, to distil more than 90% of the theoretical quantity of methanol.

The reaction mixture in next heated to 230° C. over 30 minutes. When the reaction mass has reached 230° C. the introduction of a suspension is commenced, containing:

2.99 moles of isophthalic acid (497 g)

8.00 moles of ethylene glycol (497 g)

This introduction is carried out over a period of 60 minutes while the reaction mass is maintained at 230° C.

Heating is then continued to bring the 15 reaction mass to a temperature.of 250° C. over 60 minutes.

During the period of introduction of the mixture of isophthalic acid and of ethylene glycol and the period of heating to 250° C. a mixture of water and ethylene glycol in distilled without moving back.

The reaction mixture is next transferred into an autoclave preheated to 250° C. and then placed at reduced pressure to reach a value of 10 millibars in 38 minutes, which corresponds to a driving torque of 3 N m.

The reaction mass in then poured; after cooling a water-dispersible polyester is obtained exhibiting the following characteristics:

number molecular mass=10480 sulphonate functional group contest: 11.6 mol %

OH functional group content: 0.48 eq./kg

EXAMPLE 2

Preparation of a Sulphonated Polyester

The stages described in Example 1 are repeated under the same operating conditions, by using

| | |
|---|---|
| 7.99 moles of dimethyl terephthalate | (1551 g) |
| 5.38 moles of sodium 5-dimethylsulphonateisophthalate | (1594 g) |
| 37.5 moles of ethylene glycol | (2325 g) |
| 54 ppm (by weight) of titanium in the form of butyl orthotitanate | (1.34 g) | followed by the introduction at 230° C. of a suspension of

| | |
|---|---|
| 2.00 moles of isophthalic acid | (332.6 g) |
| 5.36 moles of ethylene glycol | (332.8 g) |

The reaction mass is poured when the drive torque is 3 N m, which corresponds in this case to a reduced pressure of 100 millibars.

A water-dispersible polyester is obtained, with the following characteristics:

number molecular mass=9100 sulphonate functional group content: 35 mol %

OH functional group content: 0.39 eq./kg.

EXAMPLE 3

Preparation of a Sulphonated Polyester

The stages described in Example 1 are repeated under the same operating conditions, by using

| | |
|---|---|
| 9.04 moles of dimethyl terephthalate | (1736 g) |
| 1.46 moles of sodium 5-dimethylsulphonateisophthalate | (433 g) |
| 29.4 moles of ethylene glycol | (1825 g) |
| 54 ppm (by weight) of titanium in titanium aminotriethanolate form | (1.34 g) | followed by the introduction at 230° C. of a suspension of

| | |
|---|---|
| 2.40 moles of hydroxyisophthalic acid | (400 g) |
| 19.33 moles of ethylene glycol | (1200 g) |

The reaction mass is poured when the drive torque is 3 N m, which corresponds in thin case to a reduced pressure of 13 millibars.

A water-dispersible polyester in obtained with the following characteristics:

number-average molecular mass=13310 sulphonate functional group content; 11.3 mol %

OH functional group content: 0.54 eq./kg.

EXAMPLE 4

Preparation of a Sulphonated Polyester

The stages described in Example 1 are repeated under the same operating conditions, by using

| | |
|---|---|
| 12.17 moles of dimethyl terephthalate | (2363 g) |
| 1.99 moles of sodium 5-dimethylsulphonateisophthalate | (590 g) |
| 40.16 moles of ethylene glycol | (2493 g) |
| 54 ppm (by weight) of titanium in the form of butyl orthotitanate | | followed by the introduction at 230° C. of a suspension of

| | |
|---|---|
| 2.99 moles of isophthalic acid | (497 g) |
| 2.99 moles of glycerol | (275 g) |
| 5.01 moles of ethylene glycol | (261 g) |

The reaction mass is poured when the drive torque is 3 N m, which corresponds in this case to a reduced pressure of 13 millibars.

A water-dispersible polyester is obtained with the following characteristics:

number-average molecular mass=12130 sulphonate functional group content: 11.6 mol %

OH functional group content: 0.41 eq./kg.

EXAMPLE 5

| Formulation of a washing machine detergent composition | |
|---|---|
| Washing powder composition | parts by weight |
| zeolite 4A | 25 |
| light carbonate | 15 |
| R2A disilicate | 5 |
| Sokalan CP5 acrylic/maleic copolymer (BASF) | 5 |
| Na sulphate | 10.7 |
| carboxymethyl cellulose | 1 |
| perborate monohydrate | 15 |
| tetraacetylethylenediamine | 5 |
| linear dodecylbenzenesulphonate | 6 |
| Synperonic A3 ($C_{12}$–$C_{15}$ fatty alcohol ethoxylated with 3 EO) | 3 |
| Synperonic A9 ($C_{12}$–$C_{15}$ fatty alcohol ethoxylated with 9 EO) | 9 |
| Esperase 4.0T enzyme | 0.3 |
| antisoiling agent. | |

EXAMPLE 6

ANTISOILING PROPERTIES

The antisoiling polymers tested are introduced into the detergent composition of Example 5 in a proportion of 1% by weight of polymer active substance.

Test

Prewashing:

Polyester or polyester/cotton (65/35) squares 10×10 cm in size are prewashed in a Tergotometer for 20 minutes at 40° C. with the washing powder formulation containing 1% by weight of test polymer active substance; the water employed has a hardness of 30° TH; the quantity of washing powder used is 5 g per 1 liter of water.

The fabric squares are then rinsed 3 times for 5 minutes with cold water (14° C.) and then dried by two passes under a glazing device.

staining:

4 drops of engine sump oil are deposited on 6 of the prewashed squares and, in order to ensure the fixing of the stain, the fabrics are placed in an oven at 60° C. for 1 hour. To allow good reproducibility of the results the fabrics are washed within 24 hours.

Washing:

The washing is performed in the same conditions as the prewashing (at 40° C. for 20 minutes, with the aid of s g of washing powder containing 1% of antisoiling polymer active substance per 1 liter of water of 30° TH, then 3 rinses for 5 minutes with cold water and 2 dryings under a glazing device).

Evaluation

The reflectance of the fabrics before and after washing is measured with the aid of the Dr. Lange/Luci 100 colorimeter.

The effectiveness of the test polymer as antisoiling agent is assessed as the % of removal of the stains, calculated by the formula E in %=100×(R3−R2)/(R1−R2)

R1 denoting the reflectance of the unsoiled fabric before washing

R2 denoting the reflectance of the soiled fabric before washing

R3 denoting the reflectance of the soiled fabric after washing.

The average of the % of the stain removal is calculated for each test product.

The results obtained are given in Table 1 which follows.

| polymer | E in % |
|---|---|
| — | 10 |
| that of Example 1 | 63 |
| that of Example 2 | 80 |
| that of Example 3 | 50 |
| Gerol PS 32* | 13 | water-dispersible sulphonated polyester containing 11.62 mol % of sulphonate functional groups and with a number-average molecular mass of 25000, marketed by Rhône-Poulenc

EXAMPLE 7

PRIMARY DETERGENCY PROPERTIES

The following test pieces of standard fabrics manufactured by the CPT (Center for test materials)

cotton sebum 10D polyester/cotton (65/35) sebum 20D polyester sebum 30D test pieces 10×10 cm in size, are washed in a Tergotometer for 20 minutes at 40° C. with the above washing formulation to which 1% by weight of polymer active substance is added: the water employed has a hardness of 30° TH.

The fabrics are then rinsed 3 times for 5 minuets and dried on a glazing device.

The reflectance of the test pieces is measured with the aid of a Xenocolor (Dr. Lange) reflectometer before washing and after washing and drying, according to the "L", "a" and "b" system (scale from black to white, from green to red and from blue to yellow).

The $\Delta E$ value is calculated for each type of fabric by obtaining the geometric sum of the colour differences $\Delta L$, $\Delta a$ and $\Delta b$ before and after washing on the Soiled fabrics, that is $$\Delta E = (\Delta L2 + \Delta a2 + \Delta b2)1/2$$

The results obtained appear in the following table

| polymer | $\Delta E$ |
|---|---|
| — | 40 |
| that of Example 1 | 42 |
| that of Example 2 | 51.3 |
| that of Example 3 | 43.6 |
| Gerol PS 32 | 46.2 |

EXAMPLE 8

| Formulation of a washing machine detergent composition | |
|---|---|
| Composition of the washing powder | parts by weight |
| zeolite 4A | 25 |
| light carbonate | 15 |
| disilicate R2A | 5 |
| Sokalan CP5 acrylic/maleic copolymer (BASF) | 5 |
| Na sulphate | 5.7 |
| carboxymethyl cellulose | 1 |
| perborate monohydrate | 15 |
| tetraacetylethylenediamine | 5 |
| ethoxylated lauryl ether sulphate (1 oxyethylene unit) | 10 |
| Synperonic A3 ($C_{12}$–$C_{15}$ fatty alcohol ethoxylated with 3 EO) | 3 |
| Synperonic A9 ($C_{12}$–$C_{15}$ fatty alcohol ethoxylated with 9 EO) | 9 |
| Esperase 4.0T enzyme | 0.3 |
| antisoiling polymer of Example 2 | 1 |

The test described in Example 6 is repeated; the average of the % stain removal E is 75%.

EXAMPLE 9

| Formulation of a washing machine detergent composition | |
|---|---|
| Composition of the washing powder | parts by weight |
| zeolite 4A | 25 |
| light carbonate | 15 |
| disilicate R2A | 5 |
| Sokalan CP5 acrylic/maleic copolymer (BASF) | 5 |
| Na sulphate | 5.7 |

EXAMPLE 9-continued

Formulation of a washing machine detergent composition

| Composition of the washing powder | parts by weight |
|---|---|
| carboxymethyl cellulose | 1 |
| perborate monohydrate | 15 |
| tetraacetylethylenediamine | 5 |
| ethoxylated lauryl ether sulphate (2 oxyethylene units) | 10 |
| Synperonic A3 ($C_{12}$–$C_{15}$ fatty alcohol ethoxylated with 3 EO) | 3 |
| Synperonic A9 ($C_{12}$–$C_{15}$ fatty alcohol ethoxylated with 9 EO) | 9 |
| Esperase 4.0T enzyme | 0.3 |
| antisoiling polymer of Example 2 | 1 |

The test described in Example 6 is repeated; the average of the % stain removal E is 71%

What is claimed is:

1. A detergent composition, comprising a soil-release agent being a water-dispersible or water-soluble sulphonated polyester made by the process of esterification or transesterification and polycondensation of a monomer composition consisting of dicarboxylic diacidic monomers and a polyol monomer:

said dicarboxylic diacidic monomers comprising an unsulphonated diacidic monomer (A) consisting of at least one dicarboxylic acid or anhydride selected from the group consisting of terephthalic, isophthalic and 2,6-naphthalenedicarboxylic acids or anhydrides or their diesters, in a quantity corresponding to a molar ratio (A)/(A)+(SA) of about 95/100 to 60/100;

a sulphonated diacidic monomer (SA) consisting of at least one sulphonated aromatic or sulphonated aliphatic dicarboxylic acid or anhydride, or their diesters, in a quantity corresponding to a molar ratio (SA)/(A)+(SA) of about 5/100 to 40/100, it being possible for up to 50 mol %, of the quantity of unsulphonated diacidic monomer (A) and/or of sulphonated diacidic monomer (SA) to be replaced with a hydroxylated diacidic monomer (HA) consisting of at least one hydroxylated aromatic or aliphatic dicarboxylic acid or anhydride or a diester of the said hydroxylated aromatic or aliphatic dicarboxylic acid; and said polyol (P) consisting of at least one polyol selected from the group consisting of ethylene glycol, propylene glycol, diethylene glycol, dipropylene glycol, glycerol, 1,2,4-butanetriol and 1,2,3-butanetriol, in a quantity corresponding to a ratio of number of OH functional groups of the polyol monomer (P)/number of COOH functional groups or functional group equivalents of the diacidic monomers (A)+(SA)+(HA) of about 1.05 to 4;

said sulphonated polyester exhibiting
a number average molecular weight lower than 20 000,
a sulphur weight content of about 0.5 to 10%, and
a hydroxyl functional group content, expressed as OH equivalent/kg of polymer, higher than 0.2.

2. A detergent composition according to claim 1, wherein the molar ratio (A)/(A)+(SA) is about 93/100 to 65/100, the molar ratio (SA)/(A)+(SA) is about 7/100 to 35/100, the ratio of number of OH functional groups of the polyol monomer (P)/number of COOH functional groups or functional group equivalents of the diacidic monomers (A)+(SA)+(HA) is about 1.8 to 3, and the sulphur weight content is about 1.2 to 8%.

3. A detergent composition according to claim 1, wherein the unsulphonated diacidic monomer (A) consists of 50 to 100 mol % of terephthalic acid or anhydride or of one of its lower diesters and of 0 to 50% of isophthalic acid or anhydride or of 2,6-naphthalene-dicarboxylic acid or anhydride or of one of their lower diesters.

4. A detergent composition according to claim 1, wherein the sulphonated monomer (SA) is sulphoisophthalic, sulphoterephthalic, sulpho-ortho-phthalic acids or anhydrides, 4-sulpho-2,7-naphthalenedicarboxylic acids or anhydrides, sulpho-4,4'-bis(hydroxycarbonyl)diphenyl sulphones, sulphodiphenyldicarboxylic acids or anhydrides, sulpho-4,4'-bis(hydroxycarbonyl)diphenylmethanes, sulpho-5-phenoxyisophthalic acids or anhydrides, sulphosuccinic acids or anhydrides or their lower diesters.

5. A detergent composition according to claim 1, wherein the hydroxylated diacidic monomer (HA) is 5-hydroxyisophthalic, 4-hydroxyisophthalic, 4-hydroxyphthalic, 2-hydroxymethylsuccinic, hydroxymethylglutaric or hydroxyglutaric acids or anhydrides or their lower diesters.

6. A detergent composition according to claim 1, wherein the polyol monomer (P) is ethylene glycol or glycerol.

7. A detergent composition according to claim 1, wherein the said water-soluble or water-dispersible sulphonated polyester is made by the process of esterification and/or transesterification and polycondensation of a monomer composition based on:

terephthalic acid (A1) in diester form and isophthalic acid (A2) in the form of diacid or anhydride, or terephthalic acid (A1) in diester form and a hydroxylated terephthalic or hydroxylated isophthalic acid (HA) in the form of diacid or anhydride, optionally mixed with isophthalic acid (A2) in the form of diacid or anhydride, in an (A1)/(A1)+(A2), (A1)/(A1)+(HA) or (A1)/(A1)+(HA)+(A2) molar ratio of about 100/100 to 50/100;

sulphoisophthalic acid in diester form; and monoethylene glycol and/or glycerol.

8. A detergent composition according to claim 7, wherein the terephthalic acid (A1) and the sulphoisophthalic acid is in methyldiester form and the (A1)/(A1)+(HA)+(A2) molar ratio of about 90/100 to 70/100.

9. A detergent composition according to claim 1, wherein the quantity of polyester is about 0.01% to 10% by weight relative to the weight of the said composition.

10. A detergent composition for washing textile articles, comprising:

3 to 40% by weight, of at least one anionic surface-active agent selected from the group consisting of the sulphates of $C_5$–$C_{24}$ saturated aliphatic alcohols optionally condensed with approximately 0.5 to 30 moles of ethylene oxide, optionally and not more than 5% by weight of the detergent composition, a further anionic surface-active agent, and a soil-release agent being a water-dispersible or water-soluble sulphonated polyester made by the process of esterification or transesterification and polycondensation of a monomer composition comprising:

an unsulphonated diacidic monomer (A) consisting of at least one dicarboxylic acid or anhydride selected from the group consisting of terephthalic, isophthalic and 2,6-naphthalenedicarboxylic acids or anhydrides or their diesters, in a quantity corresponding to a molar ratio (A)/(A)+(SA) of about 95/100 to 60/100;

a sulphonated diacidic monomer (SA) consisting of at least one sulphonated aromatic or sulphonated aliphatic dicarboxylic acid or anhydride, or their diesters, in a quantity corresponding to a molar ratio (SA)/(A)+(SA) of about 5/100 to 40/100, it being possible for up to 50 mol %, of the quantity of unsulphonated diacidic monomer (A) and/or of sulphonated diacidic monomer (SA) to be replaced with a hydroxylated diacidic monomer (HA) consisting of at least one hydroxylated aromatic or aliphatic dicarboxylic acid or anhydride or a diester of the said hydroxylated aromatic or aliphatic dicarboxylic acid; and a polyol monomer (P) consisting of at least one polyol selected from the group consisting of ethylene glycol, propylene glycol, diethylene glycol, dipropylene glycol, glycerol, 1,2,4-butanetriol and 1,2,3-butanetriol, in a quantity corresponding to a ratio of number of OH functional groups of the polyol monomer (P)/number of COOH functional groups or functional group equivalents of the diacidic monomers (A)+(SA)+(HA) of about 1.05 to 4;

said sulphonated polyester exhibiting a number average molecular weight lower than 20 000, a sulphur weight content of about 0.5 to 1% and a hydroxyl functional group content, expressed as OH equivalent/kg of polymer, higher than 0.2.

11. A detergent composition according to claim 10, comprising the further anionic surface-active agent, wherein said further anionic surface-active agent being a $C_1$–C18 alkylbenzenesulphonate.

12. A detergent composition according to claim 10, wherein the textile article comprises polyester fibers.

13. A detergent composition comprising a soil-release agent being a water-dispersible or water-soluble sulphonated polyester made by the process of esterification or transesterification and polycondensation of a monomer composition essentially consisting of:

an unsulphonated diacidic monomer (A) consisting of at least one dicarboxylic acid or anhydride selected from the group consisting of terephthalic, isophthalic and 2,6-naphthalenedicarboxylic acids or anhydrides or their diesters, in a quantity corresponding to a molar ratio (A)/(A)+(SA) of about 95/100 to 60/100;

a sulphonated diacidic monomer (SA) consisting of at least one sulphonated aromatic or sulphonated aliphatic dicarboxylic acid or anhydride, or their diesters, in a quantity corresponding to a molar ratio (SA)/(A)+(SA) of about 5/100 to 40/100, it being possible for up to 50 mol %, of the quantity of unsulphonated diacidic monomer (A) and/or of sulphonated diacidic monomer (SA) to be replaced with a hydroxylated diacidic monomer (HA) consisting of at least one hydroxylated aromatic or aliphatic dicarboxylic acid or anhydride or a diester of the said hydroxylated aromatic or aliphatic dicarboxylic acid; and a Polyol monomer (P) consisting of at least one polyol selected from the group consisting of ethylene glycol, propylene glycol, diethylene glycol, dipropylene glycol, glycerol, 1,2,4-butanetriol and 1,2,3-butanetriol, in a quantity corresponding to a ratio of number of OH functional groups of the polyol monomer (P)/number of COOH functional groups or functional group equivalents of the diacidic monomers (A)+(SA)+(HA) of about 1.05 to 4;

said sulphonated polyester exhibiting a number average molecular weight lower than 20 000, a sulphur weight content of about 0.5 to 10%, and a hydroxyl functional group content, expressed as OH equivalent/kg of polymer, higher than 0.2.

14. A detergent composition comprising a soil-release agent being a water-dispersible or water-soluble sulphonated polyester made by the process of esterification or transesterification and polycondensation of a monomer composition consisting of:

an unsulphonated diacidic monomer (A) consisting of at least one dicarboxylic acid or anhydride selected from the group consisting of terephthalic, isophthalic and 2,6-naphthalenedicarboxylic acids or anhydrides or their diesters, in a quantity corresponding to a molar ratio (A)/(A)+(SA) of about 95/100 to 60/100;

a sulphonated diacidic monomer (SA) consisting of at least one sulphonated aromatic or sulphonated aliphatic dicarboxylic acid or anhydride, or their diesters, in a quantity corresponding to a molar ratio (SA)/(A)+(SA) of about 5/100 to 40/100, it being possible for up to 50 mol %, of the quantity of unsulphonated diacidic monomer (A) and/or of sulphonated diacidic monomer (SA) to be replaced with a hydroxylated diacidic monomer (HA) consisting of at least one hydroxylated aromatic or aliphatic dicarboxylic acid or anhydride or a diester of the said hydroxylated aromatic or aliphatic dicarboxylic acid; and a polyol monomer (P) consisting of at least one polyol selected from the group consisting of ethylene glycol, propylene glycol, diethylene glycol, dipropylene glycol, glycerol, 1,2,4-butanetriol and 1,2,3-butanetriol, in a quantity corresponding to a ratio of number of OH functional groups of the polyol monomer (P)/number of COOH functional groups or functional group equivalents of the diacidic monomers (A)+(SA)+(HA) of about 1.05 to 4;

said sulphonated polyester exhibiting a number average molecular weight lower than 20 000, a sulphur weight content of about 0.5 to 10%, and a hydroxyl functional group content, expressed as OH equivalent/kg of polymer, higher than 0.2.

* * * * *